United States Patent
Pollack et al.

(10) Patent No.: US 10,480,258 B2
(45) Date of Patent: Nov. 19, 2019

(54) SEALED PIPE JOINT

(71) Applicants: Single Buoy Moorings, Inc. (Switzerland Corporation), Marly (CH); GMC, Ltd., Abderdeen (GB)

(72) Inventors: Jack Pollack, Houston, TX (US); David C. Riggs, Coppell, TX (US)

(73) Assignees: SINGLE BUOY MOORINGS, INC, Marly (CH); GMC, LTD., Aberdeen (GB)

( * ) Notice: Subject to any disclaimer, the term of this patent is extended or adjusted under 35 U.S.C. 154(b) by 0 days.

(21) Appl. No.: 15/794,521

(22) Filed: Oct. 26, 2017

(65) Prior Publication Data

US 2018/0058152 A1 Mar. 1, 2018

Related U.S. Application Data

(60) Continuation of application No. 13/846,253, filed on Mar. 18, 2013, now Pat. No. 9,828,812, which is a division of application No. 13/013,739, filed on Jan. 25, 2011, now abandoned.

(60) Provisional application No. 61/316,371, filed on Mar. 22, 2010.

(51) Int. Cl.
    *F16L 15/06* (2006.01)
    *E21B 17/042* (2006.01)
    *F16L 15/00* (2006.01)

(52) U.S. Cl.
    CPC .......... *E21B 17/042* (2013.01); *F16L 15/004* (2013.01); *F16L 15/06* (2013.01)

(58) Field of Classification Search
    CPC ..... E21B 17/042; F16L 15/004; F16L 15/003; F16L 15/008
    USPC .................................................. 285/333, 334
    See application file for complete search history.

(56) References Cited

U.S. PATENT DOCUMENTS

| 3,100,656 | A  | * | 8/1963  | MacArthur | ........... | E21B 17/042 |
|-----------|----|---|---------|-----------|-------------|-------------|
|           |    |   |         |           |             | 285/333     |
| 9,239,122 | B2 | * | 1/2016  | Pollack   | ................. | F16L 15/004 |
| 9,828,812 | B2 | * | 11/2017 | Pollack   | ................. | E21B 17/042 |

\* cited by examiner

*Primary Examiner* — David Bochna
(74) *Attorney, Agent, or Firm* — Young & Thompson

(57) ABSTRACT

In a pipe joint where two pipe sections (14, 16) have threadably engaged end portions (17, 18), joint ends (32, 34) are substantially sealed to each other by a sealing surface (40, 50) on one pipe section that substantially abuts a sealing surface (42, 52) on the other pipe section. In one joint, a ring-shaped cutout (121, FIG. 7) is formed in a first pipe section and a ring-shaped spacer (120) is located in the cutout. The spacer is chosen from several that have slightly different lengths so the spacer end contacts the corresponding sealing surface (130). In a pipe string used to carry corrosive fluid, the inner surface (44) of adjacent pipe sections is covered with a corrosion resistant coating (70, 72). Where the sealing surface is connected to a rounded corner (82, 84), the coating extends to and along the sealing surfaces (40, 42). Where there are sharp corners (80) at the intersection of the inside surface (40) with the sealing surface (40B, 42B), the coating does not extend along the sealing surfaces.

15 Claims, 6 Drawing Sheets

SEALED PIPE JOINT

CROSS-REFERENCE TO RELATED APPLICATIONS

This application is a continuation of U.S. application Ser. No. 13/846,253 filed on Mar. 18, 2013 (issued as U.S. Pat. No. 9,828,812 on Nov. 28, 2017), which is a divisional of U.S. application Ser. No. 13/013,739 filed on Jan. 25, 2011, which in turn claims the benefit of U.S. Provisional Application No. 61/316,371 filed on Mar. 22, 2010, the contents of which are hereby incorporated by reference in their entireties.

FEDERALLY SPONSORED RESEARCH OR DEVELOPMENT

Not Applicable

BACKGROUND OF THE INVENTION

Pipe strings consisting of many pipe sections connected in tandem, are widely used in the sea to transfer crude oil and other hydrocarbons between the sea floor and a floating body, or between floating bodies. One common type of pipe string includes many steel pipe sections, each of a length such as 30 meters that are connected together by threaded end portions lying at opposite ends of each pipe. Applicant notes that one type of thread is a helical thread, and another type includes axially-spaced circular threads. Each end of a pair of adjacent pipe sections is preferably sealed to the other pipe section by a sealing surface on the end of one pipe section that presses against a sealing surface on the end of the other pipe section as the pipe section are threaded together. Previously, the opposite ends of a pipe sections could not both be tightly sealed, unless very high precision were used in the manufacture which results in prohibitive cost.

Many fluids to be carried by the pipe string are highly corrosive. A protective coating or cladding can be applied to the inside surface of the pipe sections, and to adjacent pipe surfaces. The cost of applying such coating can be minimized by minimizing the area to be coated, especially areas that include sharp angles.

A pipe joint that includes a pipe with threaded portions and with sealing surfaces at the ends, often includes tongue and groove joints that lie beside sealing surfaces. There is occasional fracture of the steel pipe end at a side of the groove.

BRIEF SUMMARY OF THE INVENTION

In accordance with one embodiment of the present invention, a corrosion resistant pipe string is provided with threaded pipe joints that are constructed to substantially seal to one another. To assure that the sealing surfaces at opposite ends of a pipe section abut corresponding sealing surfaces, applicant shortens one of the abutments to create a cutout. Applicant also provides a ring-shaped spacer that lies in the cutout. Several spacers are available of very slightly different lengths, and during pipe string assembly a spacer is chosen that just fills the cutout.

To protect the pipe sections against corrosion by corrosive fluid, the inside of each pipe section is coated, as by a cladding of corrosion resistant material. Where there is a rounded corner between the inside of the pipe and a sealing surface, the coating is extended around the corner and along the sealing surfaces, but no further. To avoid extending the coating around a rounded corner, the sealing surfaces each can be provided with a sharp (small radius of curvature) corner so the two corners abut one another.

The pipe ends include tongue and groove connections. To avoid one of the pipes fracturing at the outer side of the groove, the groove bottom is provided with a small radius of curvature. This allows the outer side of the groove to be provided with a large radius of curvature so that stresses are better resisted.

To prevent the threaded end portions of the pipe sections from turning to loosen the threaded connection, at least one pipe thread is knurled to generate small ridges that resist loosening.

The novel features of the invention are set forth with particularity in the appended claims. The invention will be best understood from the following description when read in conjunction with the accompanying drawings.

BRIEF DESCRIPTION OF THE SEVERAL VIEWS OF THE DRAWING(S)

DETAILED DESCRIPTION OF THE PREFERRED EMBODIMENTS

Figure 1:
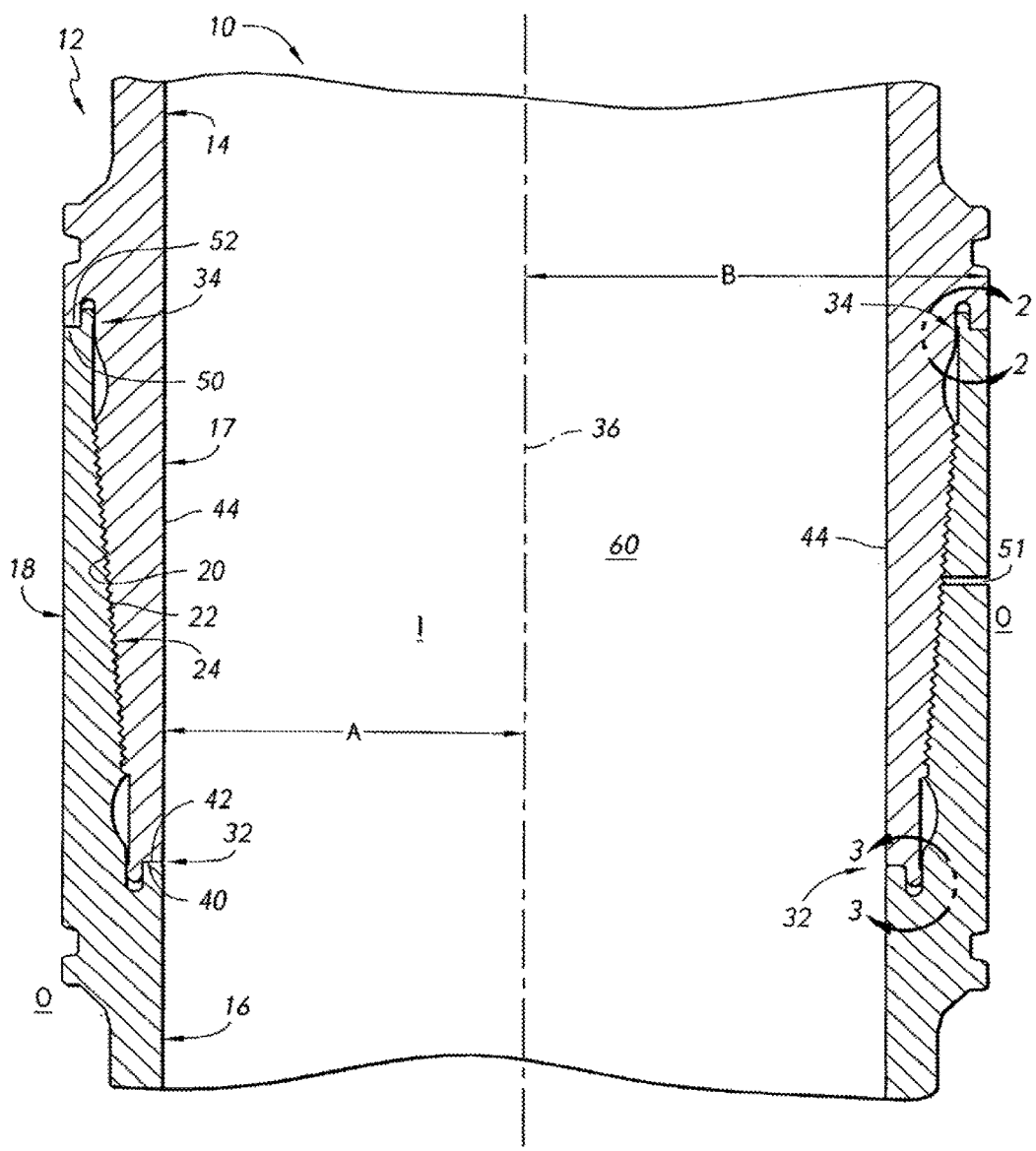
FIG. 1 is a sectional view of a joint portion of a pipe string, showing the threadably connected adjacent ends of two pipe sections and showing the sealing surfaces at the opposite ends of the threads.
Figure 2:
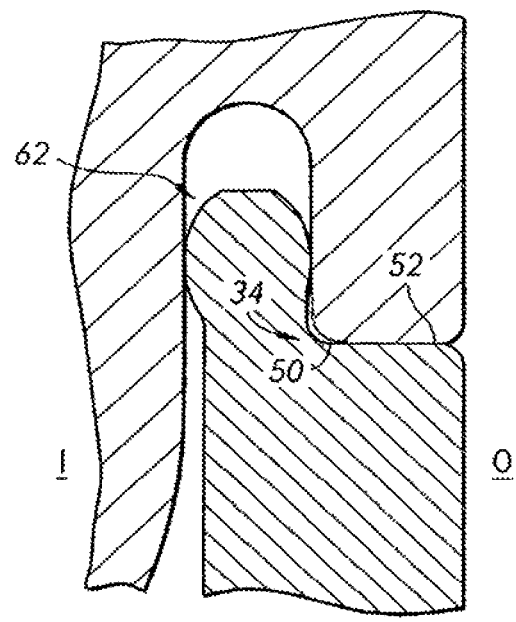
FIG. 2 is a sectional view of area 2-2 of FIG. 1.

FIG. 1 shows a pipeline, or pipe string 10 that includes many steel pipe sections, each of a length such as 30 meters, which are threadably connected in tandem. Applicant notes that one type of threaded joint includes a helical thread, and another type includes axially-spaced (with respect to the pipeline axis) circular threads that lie on an imaginary cone. FIG. 1 shows a pipe joint 12 where adjacent end portions 17, 18 of two pipe sections 14, 16 are connected. The joint includes threads 20 22 on the two pipe sections that term a threaded connection 24. The threads are tightened to press the two pipe ends close together at sealing surfaces 40, 42, 50, 52 that lie at axially (A) opposite joint ends 33, 34. To minimize thread chafing during a threadable connection applicant forms a port 51 in the radially (with respect to axis 36) outer pipe end 18. The joint can be pressurized by a fluid (liquid or gas) directed through the port 51, which compresses radially inner pipe end 17 and which expands radially outer pipe end 18, thereby easing the threads 20, 22 over one another.

Joint end 32 has upper and lower abutments, or sealing surfaces 40, 42 that both lie at the inside I of the pipeline. Joint end 34, which is shown located at the upper end of the joint 12, has radially outer (with respect to the axis 36) sealing surfaces.

Of the two joint ends 32, 34, usually only one, which is the upper and outer abutment location 34 has its abutment faces 50, 32 forcefully abutting one another when the threads are fully tightened. It would require extremely close dimensional tolerances (e.g. less than about 0.02 mm, or 0.001 inch) to assure forceful abutment of the abutment surfaces at both joint end 32, 34. To manufacture the pipe section ends to these tolerances would be difficult and costly.

Applicant causes the inner sealing surfaces 40, 42 and the outer sealing surfaces 50, 52 to forcefully abut one another and form a fluid seal thereat that prevents the ingress and egress of fluids. This also preloads the connector threads to thereby reduce fatigue stresses and stabilize metal-to-metal seal movement at the pine joint ends 32, 34 shown in FIG. 7.

The inside I (FIG. 1) of the pipe joint is exposed to fluids 60 lying in the pipe, which may include corrosive chemicals when the pipeline is used to carry a mixture of hydrocarbons and corrosive components such as is often found in crude oil. The outside O of the pipe joint is exposed to seawater or atmospheric conditions.

Figure 3:
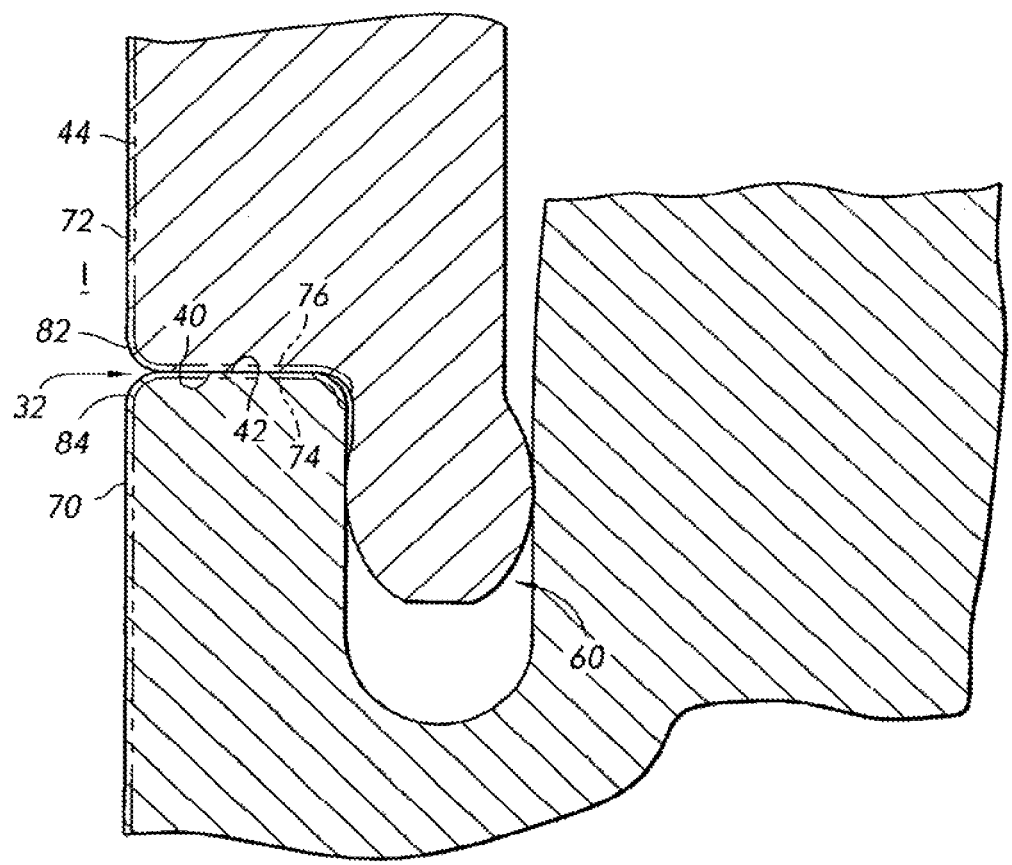
FIG. 3 is a sectional view of area 3-3 of FIG. 1.

In recent years, offshore oil production has been conducted in ever deeper waters, with the present maximum depth being about 7000 to 10,000 feet. In such depths, steel pipelines connected to floating production units are usually employed to transport well fluids from the seabed to the sea surface. The high seawater pressure at large depths requires large pipe wall thickness to resist collapse, although the pipe inside diameter must be large enough for economic hydrocarbon production rates. This leads to relatively stiff pipes and high bending stresses, especially where a pipeline hanging in a catenary shape makes contact with the seabed. This bending is repetitive as it is the result of the heave of the surface vessel which is constantly being excited by surface waves. This repetitive bending leads to pipe fatigue. This fatigue can be accelerated by the presence of $H_2S$, $CO_2$ or other chemicals in the well fluids flowing through these pipes, which can lead to a very limited pipe fatigue life. To minimize this chemical effect, Applicant prefers to apply a CRA (corrosion resistant alloy) cladding (a type of coating), shown in phantom lines at 70, 72 in FIG. 3, on the inside surface 44 of the pipeline, with portions 74, 76 of the cladding lying on the inside sealing surfaces 40, 42. Since the inside joint end 32 is closed during use, the cladding portions 74, 76 at the abutting surfaces need not be thicker than on the rest of the inside of the pipe. The corners 82, 84 between the radially inside surfaces 44 and the sealing surfaces 40, 42 have a large radius of curvature of at least 0.05 inch so the cladding extends over them.

Figure 4:
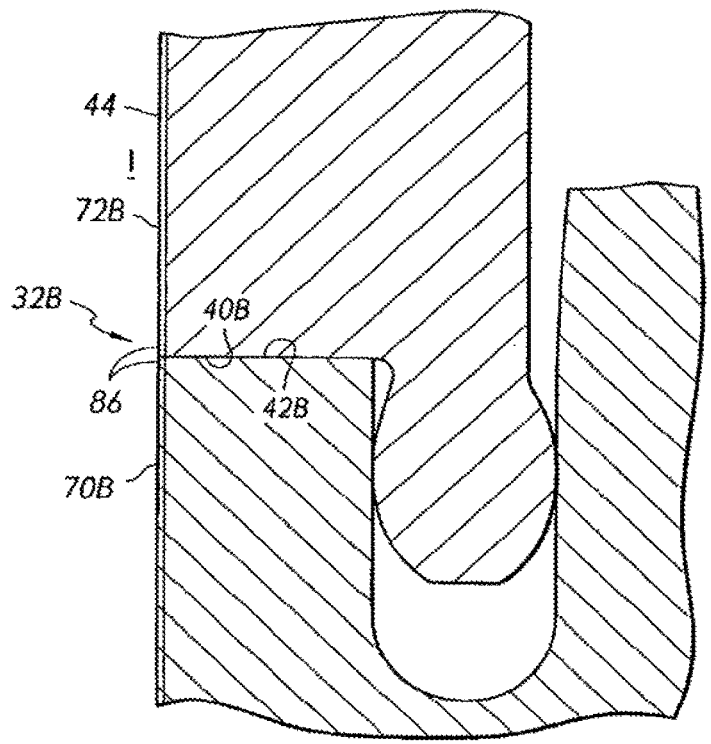
FIG. 4 is a sectional view similar to that of FIG. 3, but with a corrosion-resistant cladding on the entire straight inside portion of the pipes.
Figure 5:
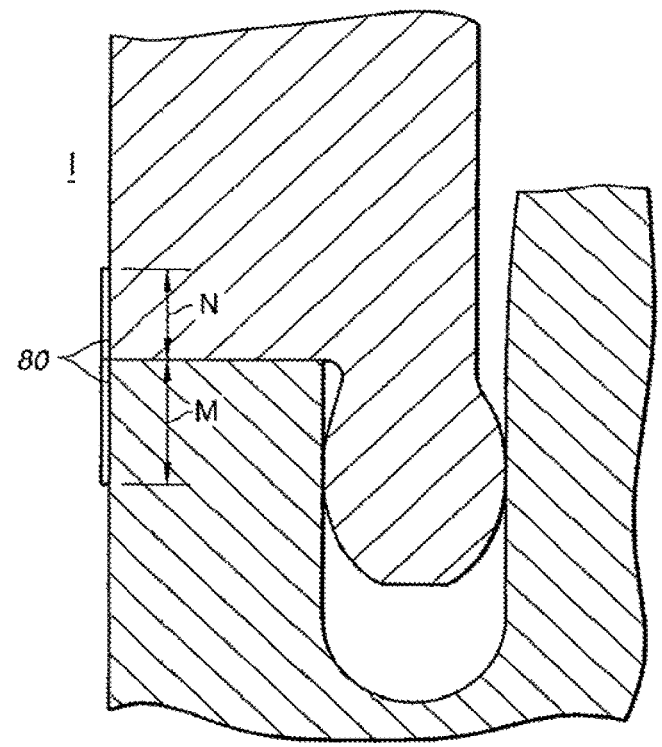
FIG. 5 is sectional view similar to that of FIG. 4, but with a corrosion-resistant cladding on only the inside portion that lies adjacent to the sealing surfaces.

FIG. 4 shows one alternative construction of a pin end 32B, where CRA cladding portions 70B, 72B have been applied on the inside surface of the pipeline, but not on the sealing surfaces 40B, 42B. The corners 86 have a small radius of curvature of less than 0.05 inch so the cladding portions lie facewise adjacent to each other and do not extend around the corners, FIG. 5 shows another alternative, where the cladding extends only a limited distance M, N on either side of the inside 80 of the abutment, where M and N are no more than half each pipe section length.

Figures 6, 7:
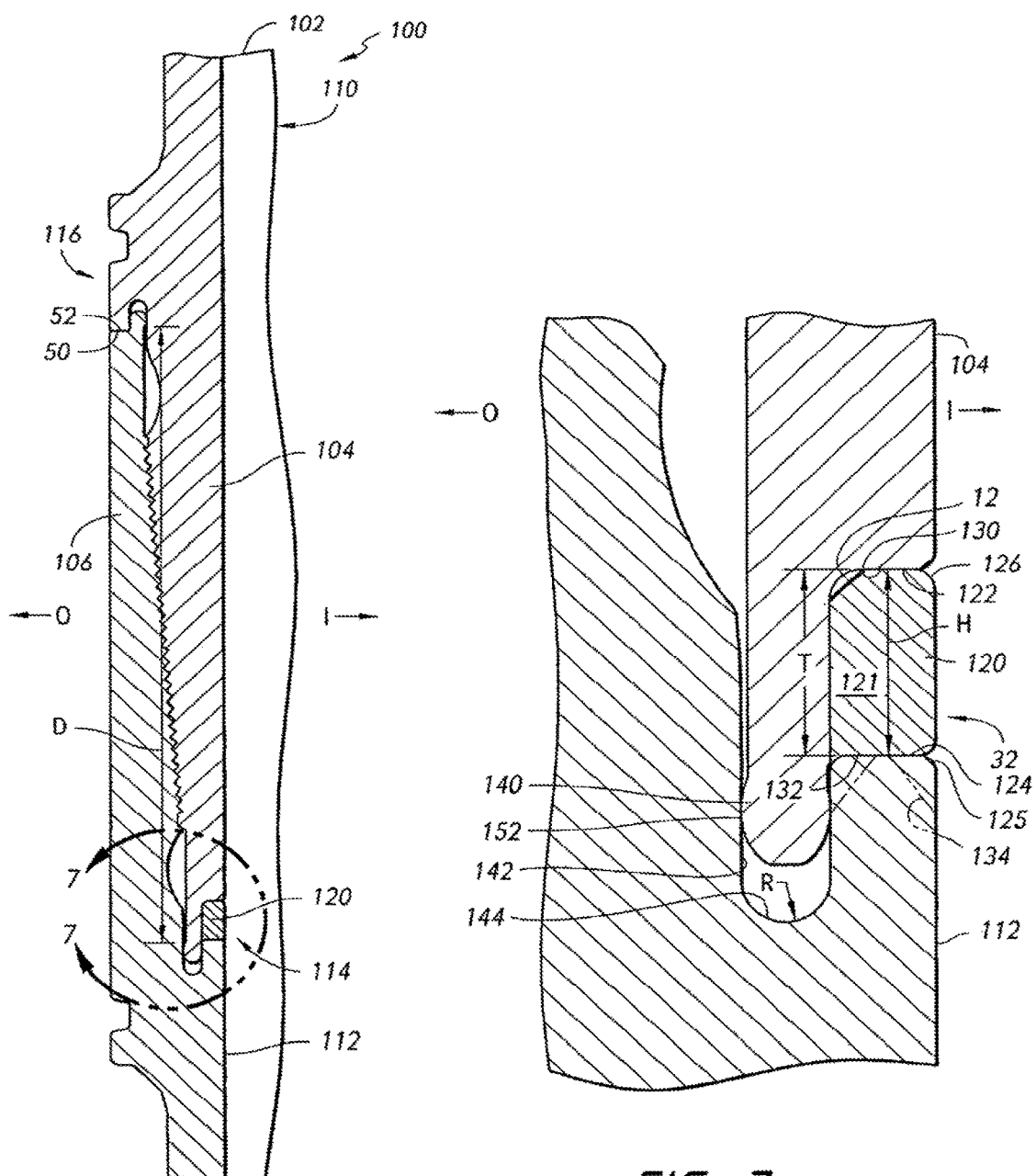
FIG. 6 is a sectional view of only one side of the pipe joint of a pipe string similar to that of FIG. 1, bat with a spacer lying in a cutout.
FIG. 7 is a sectional view of the cutout and spacer region of the joint portion of FIG. 6.

FIG. 6 shows another pipe joint 100 along a pipeline 102 in which adjacent ends 104, 106 of two pipe sections 110, 112 are threadably connected, which provides sealing at axially-spaced inside and outside locations, or joint ends 114, 116 at the bottom and the top of the pipe joint. The sealing is made by parts that are precisely spaced along the pipeline axis, but which can be made with high precision at moderate cost. At the upper and outside seal location 116, sealing surfaces 50, 52 of the two pipe sections directly abut one another in the same manner as in FIG. 1. However, at the lower and inside seal location 114, applicant provides a spacer 120 (FIG. 7) that lies in a gap 121 that results in a short end (125). The spacer abuts both a shoulder 122 on the upper pipe section end and a shoulder 124 on the lower pipe section end.

The spacer 120, which is in the form of a ring, is preferably formed of metal in order to withstand the high compressive forces applied when the two pipe sections are tightly threaded together. Applicant may fabricates multiple spacers with slightly different heights, or axial thicknesses T. A storage container containing many spacers of slightly different thicknesses H are provided near the location where the pipes are to be joined. In one example, for steel pipes of 12 inches diameter (at the inside), multiple spacers are provided whose thicknesses vary in increments of 0.02 mm (0.001 inch). The lengths of the pipe section ends are preferably constructed with precision, with an accumulated tolerance and therefore variation in gap height H such as 0.2 mm (0.1 inch). Recent studies show that several spacers may not have to be taken into the field, and therefore the spacer ring may be pressed into place before equipment is taken into the field.

Before assembling pipe sections, applicant calculates and/or measures the size of the gap H to be filled by the spacer, for two pipe ends that are to be joined. This may be done with a laser range finder or a more conventional caliper. Applicant measures the distance D (FIG. 6) between the two sealing surfaces of each pipe joint end. The spacer height H is chosen to equal the difference. A spacer of the proper thickness is selected to fill the gap when those two pipe section ends are to be joined. The pipe sections and spacer are preferably numbered and kept together so that the particular spacer can be used when those two pipe section ends are threadably joined. It would be possible to join two pipe sections and measure the gap before disassembly to insert the spacer. However, such a process consumes time and idles high cost workers and equipment which would be most efficiently used to join pipe sections.

The spacer 120 (FIG. 7) is shown as having a rectangular cross section with slightly rounded corners 126 and with one beveled corner 128 that lies at an inside corner of a pipe section end. The sealing, or abutting faces 130, 132 of the spacer are shown as flat. However, it is possible to form a sealing face with one or more ridges, as shown at 134, to enable greater axial compression of the spacer at a given compression force. It also is possible to use a material other than steel such as one that is more easily compressed, if a suitable material is found.

Applicant, prefers to place the spacer 120 at the inside of the pipeline, where the spacer cannot be dislodged if the pipeline is hit, it would also be possible to move the spacer 120 to the outer abutment surface 34 in which case the inner abutment could be machined to be without a ring spacer 120. It would also be possible to simplify and also rectify the machining of the connector in such a way that one uses spacers 120 at both joint ends 32 and 34.

The pipeline shown in the figures has a diameter (outside) of 20 inches and a wall thickness of one inch (along much of its length). The spacer 120 has a radial width of 0.33 inch and an axial height of 0.75 inch. The pipes and spacer are each fabricated of steel.

Figure 9:
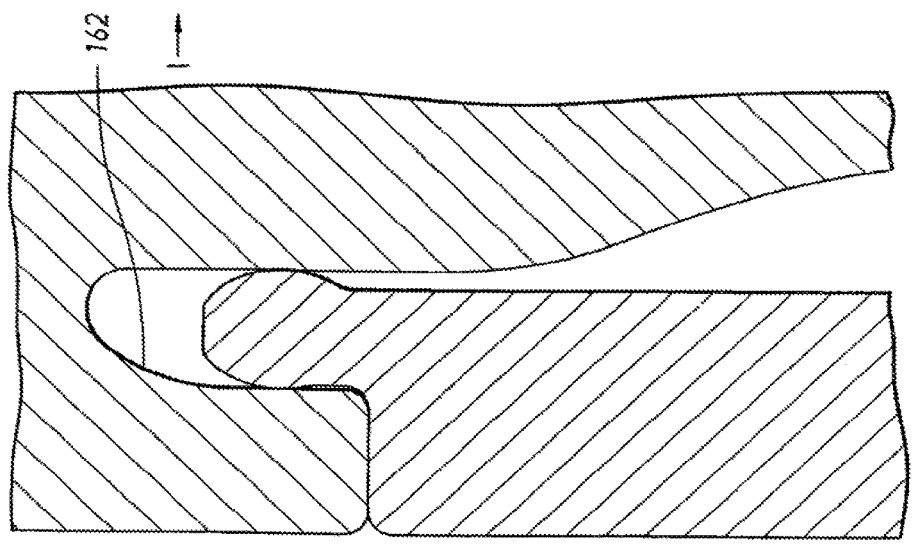
FIG. 9 is a view similar to that of FIG. 3, showing the gradual curvature at one side of the groove.
Figure 8:
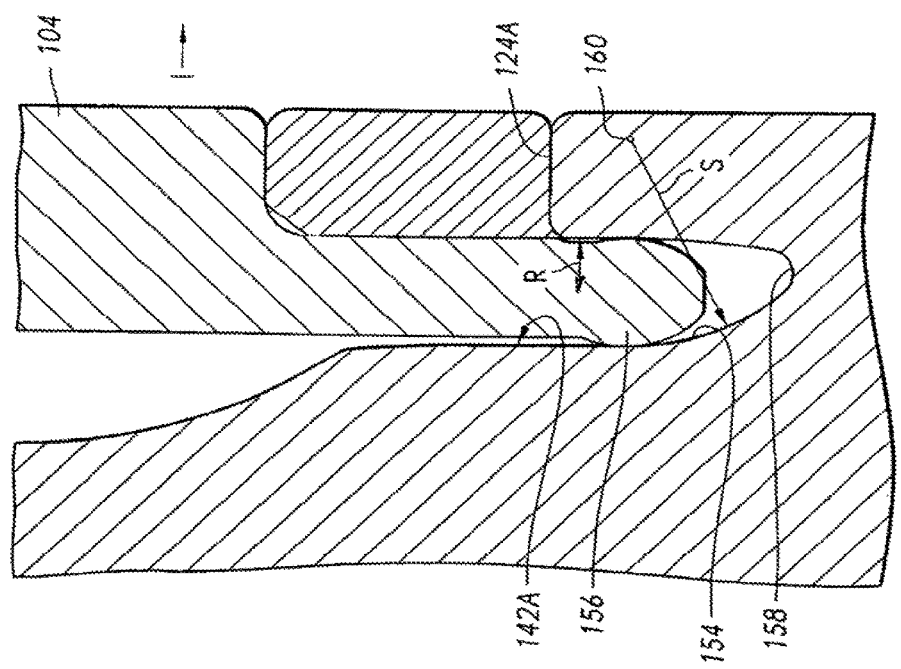
FIG. 8 is a sectional view similar to that of FIG. 2, but with a tongue and groove connection constructed with a gradual curvature at one side of the groove.

In the tongue and groove joint portion of FIG. 7, one pipe end portion 104 forms a tongue 140 that is received in an interference fit in a groove 142 of the other pipe end portion 112. In FIG. 7 the groove end 144 has about the same radius of curvature as the tongue end, and the radius R is half the distance 2R across the groove. Applicant has found that the walls of the groove 142 sometimes would crack in the outer curved part of the groove due to repetitive bending stress. Applicant found that by forming the outside 154 (FIG. 8) of the groove at 142A that lies adjacent to sealing surface 124A with a moderate radius of curvature S instead of a straight side, applicant avoided such cracking. The groove side 154 has a radius of curvature S at least 50% greater than the distance R which is half the groove width, but less than 10R. In FIG. 8 the radius of curvature is centered at 160 and is four times the distance R. The bottom 150 of the groove has a small radius of curvature that is less than half the width 2R, but lies away from the tongue. In making the wide outer curvature in groove 142 (FIG. 7) the groove becomes asymmetric and ends up with a curvature at the inside of the connector, as shown in FIGS. 8 and 9. The upper groove 182 shown in FIG. 9, is similarly curved.

In the tongue and groove joint portion of FIG. 7, one pipe end portion 104 forms a tongue 140 that is received in an interference fit in a groove 142 of the other pipe end portion 112. In FIG. 7 the groove end 144 has about the same radius of curvature as the tongue end, and the radius R is half the distance 2R across the groove. Applicant has found that the walls of the groove 142 sometimes would crack in the outer curved part of the groove due to repetitive bending stress. Applicant found that by forming the outside 154 (FIG. 8) of the groove at 142A that lies adjacent to sealing surface 124A with a moderate radius of curvature S instead of a straight side, applicant avoided such cracking. The groove side 154 has a radius of curvature S at least 50% greater than the distance R which is half the groove width, bet less than 10R. In FIG. 8 the radius of curvature is centered at 160 and is four times the distance R. The bottom 150 of the groove has a small radius of curvature that is less than half the width 2R, but lies away from the tongue. In making the wide outer curvature in groove 142 (FIG. 7) the groove becomes asymmetric and ends up with a curvature at the inside of the connector, as shown in FIGS. 8 and 9. The upper groove 182 shown in FIG. 9, is similarly curved.

Figure 11:
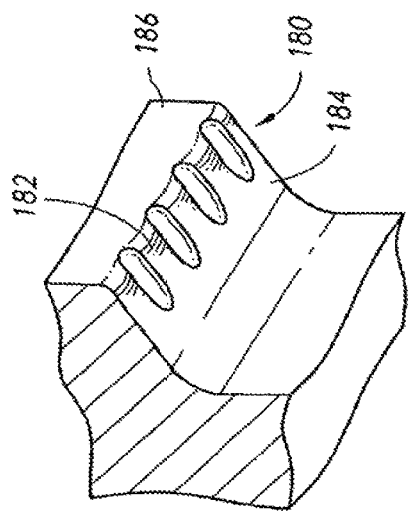
FIG. 11 is an isometric view of a portion of one of the thread lengths of FIG. 10.
Figure 10:
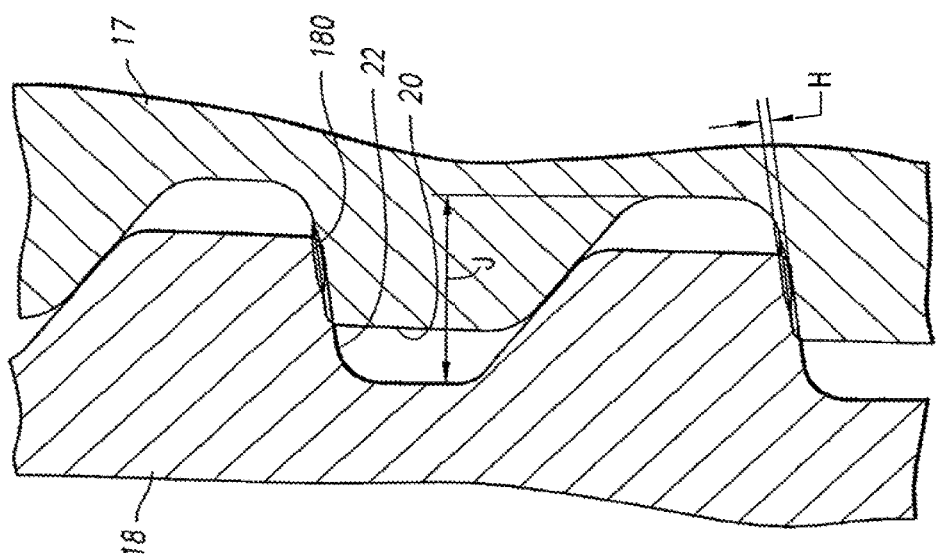
FIG. 10 is a sectional view of a pair of thread lengths of the threadably joined end portions of the pipe sections of FIG. 1, showing knurling.

FIG. 1 shows that the adjacent pipe end portions 17, 18 are connected by concentric parallel threads. Steps should be taken to be sure that after the threads 20, 22 are threadably connected, they do not slip by torque applied to one of the pipe end portions relative to the other. Applicant prefers to do this by knurling the threads. FIGS. 10 and 11 show knurling 180. In knurling, small grooves are formed by pressing a knurling tool against a location on the threads. The pressure of knurling displaces the material that forms the threads to form depressions separated by slight projections 182. The displaced material prevents the threads from turning relative to each other unless a large torque is applied. Applicant provides knurling at one side of the threads in a thread groove wall 184 rather than in the cylindrical wall 186, of a height H of 0.004 inch and width of 0.030 inch. Applicant could resist relative turning by roughening surfaces that turn relative to each other and that are not part of the threads, as by shot peening. However threads are precisely cut surfaces, and the knurling formed in them is more precise than roughening of a smooth (non-threaded) surfaces.

In the case of axially spaced concentric threads, there can be cases where the torsional resistance of the knurling 180 may not be sufficient to keep the connector from slipping. Applicant prefers to make the surfaces of the tongue 140 (FIG. 7) and groove 142 of materials that will allow slippage without causing damage to these surfaces. This can be aided with the use of an anti galling coatings or lubricants or by the use of different materials of these contacting surfaces. In the event these surfaces cannot be kept from damage by slippage, applicant inserts a key into grooves machined into the threads of connector halves to prevent slippage.

Thus, the invention provides pipe joints for connecting the threaded ends of a pass of pipe sections, which minimizes corrosion resulting from corrosive fluids, which enables an abutment at each end of the point to abut a sealing surface at moderate cost, and which avoids cracking of a pipe at a groove. Corrosion is avoided by coating the inside end of each pipe section where it lies adjacent to an inside end of the other pipe section. Where there is a large radius of curvature lot more than 0.05 inch) at the adjacent corners of the two pipe inside ends, the corners and facing surfaces are coated, preferably by a corrosion-resistant cladding. Where the inside ends of the two pipes abut each other at sharp corners (radius of curvature less than 0.01 inch), no coating is applied beyond the corners to lie on the facing surfaces. Sealing surfaces at opposite ends of each pipe can be made to abut one another by making one pipe end short and placing a spacer at that end, with the spacer chosen to precisely fill the gap to the adjacent sealing surface. Where a tongue and groove joint connects the pipe ends, cracking at one side wall of the groove is avoided by making a portion of that groove wall with a large radius of curvature.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. A pipe string (102), comprising:
  a pipe joint (100) that connects first and second threaded ends (104, 106) of a pair of pipe sections (110, 112),
  said pipe joint having first and second joint ends (114, 116), said joint ends including a first joint end (116) having facewise adjacent, directly abutting first axial sealing surfaces (50, 52) that are perpendicular to a longitudinal axis of the pipe joint,
  wherein a second joint end (114) of said joint ends has a ring-shaped cutout (121) lying adjacent to a second axial sealing surface (130), so said second joint end has a short second end (125) that is spaced from said second axial sealing surface (130) that is perpendicular to the longitudinal axis of the pipe joint,
  the second joint end also having a ring-shaped spacer (120), formed of a substantially incompressible material, located between and directly axially abutting said short second end (125), at a sealing or abutting axial face (132) that is also perpendicular to the longitudinal axis of the pipe joint, and said second axial sealing surface (130), and
  wherein said ring-shaped spacer (120) is sized and configured such that the first axial sealing surfaces (50, 52), the spacer (120), the short second end (125) at the abutting face (132), and the second axial sealing surface (130) are each loaded in the axial direction of the pipe (102) when the pipe joint (100) is fully assembled.

2. The pipe string as claimed in claim 1, wherein said pipe joint has radially inner (I) and outer (O) sides, and said cutout and said spacer both lie at said inner side.

3. The pipe string as claimed in claim 1, wherein said threaded ends of said pair of pipe sections have threads (20, 22) that are threaded together, with said threads (20, 22) lying between said first joint end (34) that forms said first sealing surfaces (50, 52) and said second joint end (32), whereby to initially hold said threads under tension.

4. The pipe string as claimed in claim 1, wherein said pipe sections and said spacer are each formed of steel.

5. The pipe string as claimed in claim 1 wherein the substantially incompressible material is a metal.

6. The pipe string as claimed in claim 1, wherein the ring-shaped spacer is substantially rigid.

7. The pipe string as claimed in claim 1, wherein the first and second threaded ends (104, 106) have threads that comprise a cylindrical wall (186) and a thread groove wall (184) and at least a portion of the thread groove wall has an annular array of alternating projections (182) and depressions.

8. The pipe string as claimed in claim 7, wherein the projections are comprised of material displaced by forming the depressions.

9. The pipe string as claimed in claim 7, wherein the cylindrical walls (186) of the threads are free of such alternating projections (182) and depressions.

10. The pipe string as claimed in claim 7, wherein the projections (182) have a height H of about 0.004 inch and width of about 0.030 inch.

11. The pipe string as claimed in claim 1, wherein the axial sealing surfaces have corners (86) with a radius of curvature of less than 0.05 inch and at least a portion of the inner surface of the pipe string has a corrosion-resistant cladding that extends at least to the first and second joint ends that lie facewise adjacent to each other but does not extend around the corners (86).

12. The pipe string as claimed in claim 11, wherein the cladding extends only a distance M, N on either side of the inside (80) of an abutment between the first and second joint ends (114, 116), and wherein M and N are no more than half each pipe section length.

13. The pipe string as claimed in claim 1, wherein the axial sealing surfaces (40, 42) have rounded corners (82, 84) with a radius of curvature greater than 0.05 inch and at least a portion of the inner surface (44) of the pipe string proximate the first and second joint ends that lie facewise adjacent to each other has a corrosion-resistant cladding (70, 72, 74, 76) that extends around the corners (82, 84) and covers abutting sealing surfaces (40, 42) on the second joint end (32).

14. A method for installing a pipe string first and second threaded end portions (32, 34) of pairs of adjacent pipe sections are threadably connected to form a pipe joint 100 with opposing first and second joint ends (114, 116), with the threads tightened so axial sealing surfaces (50, 52) of said first and second pipe section ends which are perpendicular to the longitudinal axis of the pipe string directly axially abut each other, including comprising:
 constructing said first joint end with a cutout (121) at a first end part; and
 installing a ring-shaped spacer (120) in said cutout, said ring-shaped spacer (120) being formed of a substantially incompressible material and provided with an axial length (T) that permits the axial sealing surfaces (50, 52) to axially abut each other when opposing axial faces (130, 132) of the ring-shaped spacer (120) are fully seated on opposing radial shoulders (122, 124) on a pipe end portion (104) and a pipe section (112), and are perpendicular to the longitudinal axis of the pipe string.

15. The method as claimed in claim 14, wherein the axial length of the ring-shaped spacer installed is such that the axial sealing surfaces (50, 52) of said first joint end and axial surfaces of the second joint end are each loaded in the axial direction of the pipe (102) when the pipe joint is fully assembled.

* * * * *